US007620406B2

(12) United States Patent (10) Patent No.: US 7,620,406 B2
Nagashima et al. (45) Date of Patent: Nov. 17, 2009

(54) MOBILE RADIO TERMINAL APPARATUS

(75) Inventors: Youichi Nagashima, Hachioji (JP); Natsuko Ouchi, Kawasaki (JP); Ayako Hosoi, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 351 days.

(21) Appl. No.: 11/497,738

(22) Filed: Aug. 2, 2006

(65) Prior Publication Data

US 2007/0232334 A1 Oct. 4, 2007

(30) Foreign Application Priority Data

Mar. 29, 2006 (JP) ............................. 2006-091167

(51) Int. Cl.
*H04W 4/00* (2006.01)
(52) U.S. Cl. .............. 455/465.1; 455/556.2; 455/456.2; 455/562.1; 455/550; 455/466
(58) Field of Classification Search .............. 455/550.1, 455/456.1, 457, 553, 562.1, 404.2, 466, 428, 455/12.1, 556.2
See application file for complete search history.

(56) References Cited

U.S. PATENT DOCUMENTS

| | | | | |
|---|---|---|---|---|
| 5,546,092 | A * | 8/1996 | Kurokawa et al. | 342/357.06 |
| 6,430,409 | B1 * | 8/2002 | Rossmann | 455/422.1 |
| 6,738,628 | B1 * | 5/2004 | McCall et al. | 455/456.1 |
| 6,819,258 | B1 * | 11/2004 | Brown | 340/825.49 |
| 7,016,687 | B1 * | 3/2006 | Holland | 455/456.1 |
| 7,054,667 | B2 * | 5/2006 | Ketola | 455/566 |
| 7,218,912 | B2 * | 5/2007 | Erskine et al. | 455/405 |
| 7,546,127 | B2 * | 6/2009 | Caspi et al. | 455/456.1 |

FOREIGN PATENT DOCUMENTS

| | | |
|---|---|---|
| JP | 2001-297355 A | 10/2001 |
| JP | 2002-300650 A | 10/2002 |

(Continued)

OTHER PUBLICATIONS

Japanese Office Action dated Feb. 3, 2009 (3 pages), and English translation thereof (3 pages) issued in counterpart Japanese Application No. 2006-091167.

(Continued)

*Primary Examiner*—Kamran Afshar
*Assistant Examiner*—Ezana Getachew
(74) *Attorney, Agent, or Firm*—Frishauf, Holtz, Goodman & Chick, P.C.

(57) ABSTRACT

When a holder of a cellular telephone operates a specific-key, the cellular telephone composes an e-mail containing a location-name, location-information, positioning-accuracy and positioning-time and sends the e-mail to a mail-address registered in a location-notification-address-table. In addition, when the cellular telephone receives an e-mail from the address registered in the location-notification-address-table, the cellular telephone composes an e-mail containing a location-name, location-information, positioning-accuracy and positioning-time, and sends the composed mail to a sender of the received e-mail. Moreover, when a departure-notification-time registered in a notification-location-table has come, the cellular telephone executes positioning, discriminates whether or not the holder exists in the vicinity of the location-name corresponding to the departure-notification-time, and sends an e-mail to a mail-address registered in the location-notification-address-table to notify whether or not the holder has departed from the location.

8 Claims, 8 Drawing Sheets

FOREIGN PATENT DOCUMENTS

| | | |
|---|---|---|
| JP | 2002-314641 A | 10/2002 |
| JP | 2003-110752 A | 4/2003 |
| JP | 2003-149317 A | 5/2003 |
| JP | 2003-163959 A | 6/2003 |
| JP | 2003-284154 A | 10/2003 |
| JP | 2003-304322 A | 10/2003 |
| JP | 2004-112126 A | 4/2004 |
| JP | 2004-207993 A | 7/2004 |
| JP | 2004-235862 A | 8/2004 |
| JP | 2004-336532 A | 11/2004 |
| JP | 2004-350109 A | 12/2004 |
| JP | 2004-355539 A | 12/2004 |
| JP | 2005-44197 A | 2/2005 |
| JP | 2005-175896 A | 6/2005 |
| JP | 2005-303864 A | 10/2005 |

OTHER PUBLICATIONS

Japanese Office Action dated Sep. 8, 2009 and English translation thereof issued in a counterpart Japanese Application No. 2006-091167.

\* cited by examiner

| Destination | E-mail address | Setting for denying confirmation |
|---|---|---|
| Papa | papa@··· | ON |
| Mama | mama@··· | OFF |
| ⋮ | ⋮ | ⋮ |

| | Location information<br>( North latitude / East longitude ) | Departure time | Arrival time |
|---|---|---|---|
| Current location | 35°38'53.13" / 139°45'38.77" | 1 | 12 : 34 |

FIG. 4

| Name of location | Location information<br>( North latitude / East longitude ) | Departure time | Arrival time |
|---|---|---|---|
| School | 35°42'26.44" / 139°45'48.30" | 16 : 00 | 8 : 00 |
| Park | 35°40'15.10" / 139°45'32.95" | 17 : 00 | 16 : 30 |
| Crammer | 35°40'45.14" / 139°42'16.62" | 21 : 00 | 19 : 00 |
| ⋮ | ⋮ | ⋮ | ⋮ |

FIG. 5

|  |  | Confirmation request ||
|---|---|---|---|
|  |  | Yes | No |
| Confirmation reject setting | ON | Reject | Permit (to be confirmed) |
|  | OFF | Permit | Permit (to be confirmed) |

FIG. 8

MOBILE RADIO TERMINAL APPARATUS

CROSS-REFERENCE TO RELATED APPLICATIONS

This application is based upon and claims the benefit of priority from prior Japanese Patent Application No. 2006-091167, filed Mar. 29, 2006, the entire contents of which are incorporated herein by reference.

BACKGROUND OF THE INVENTION

1. Field of the Invention

This invention relates to a mobile radio terminal apparatus in a mobile communications system such as a cellular telephone system.

2. Description of the Related Art

Mobile communications terminals such as cellular telephones have spread widely. Some types of mobile communications terminals are equipped with a GPS (Global Positioning System) receiver and comprise a function of detecting exact location information. Recently, urging children, aged persons, handicapped persons, etc. to carry cellular telephones and send location information about the holders carrying the cellular telephones to a person to receive the information by e-mail is considered (refer to, for example, Jpn. Pat. Appln. KOKAI Publication No. 2005-303864).

According to Jpn. Pat. Appln. KOKAI Publication No. 2005-303864, however, since the cellular telephone autonomously sends the location information about the holder carrying the cellular telephone, a receiver of the location information cannot recognize the holder's location at a desired timing. In addition, even if the holder wishes to notify the recipient of the location information, the holder cannot send the location information rapidly or easily to the recipient since complicated operations are required for notification of the information.

BRIEF SUMMARY OF THE INVENTION

The present invention has been accomplished to solve the above-described problems. The object of the present invention is to provide a mobile radio terminal apparatus having convenience enhanced to send location information about a holder carrying the apparatus to a person to receive the information.

To achieve this object, an aspect of the present invention is a mobile radio terminal apparatus comprising location detection unit configured to receive a signal from a GPS satellite and to obtain a location information in accordance with the signal, operation unit configured to accept a request from a user, control unit configured, if the operation unit accepts the request from the user, to compose an e-mail including the location information obtained by the location detection unit, and transmitter configured, after the control unit composes the e-mail, to transmit the e-mail.

In the present invention, as described above, when a user requests location information, an e-mail including the location information is formed and sent to the recipient in response to the request.

Therefore, the present invention can provide a mobile radio terminal apparatus having much convenience that enables the holder of the apparatus to notify the recipient of the location information, rapidly, with simple operations.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 shows a location information table to be stored in a memory unit of the cellular telephone shown in FIG. 2;

FIG. 5 shows a notification place table to be stored in a memory unit of the cellular telephone shown in FIG. 2;

FIG. 8 shows a flowchart of operations of controlling a location notification mail function of the cellular telephone shown in FIG. 2.

DETAILED DESCRIPTION OF THE INVENTION

An embodiment of the present invention will be explained below with reference to the accompanying drawings.

Figure 1:
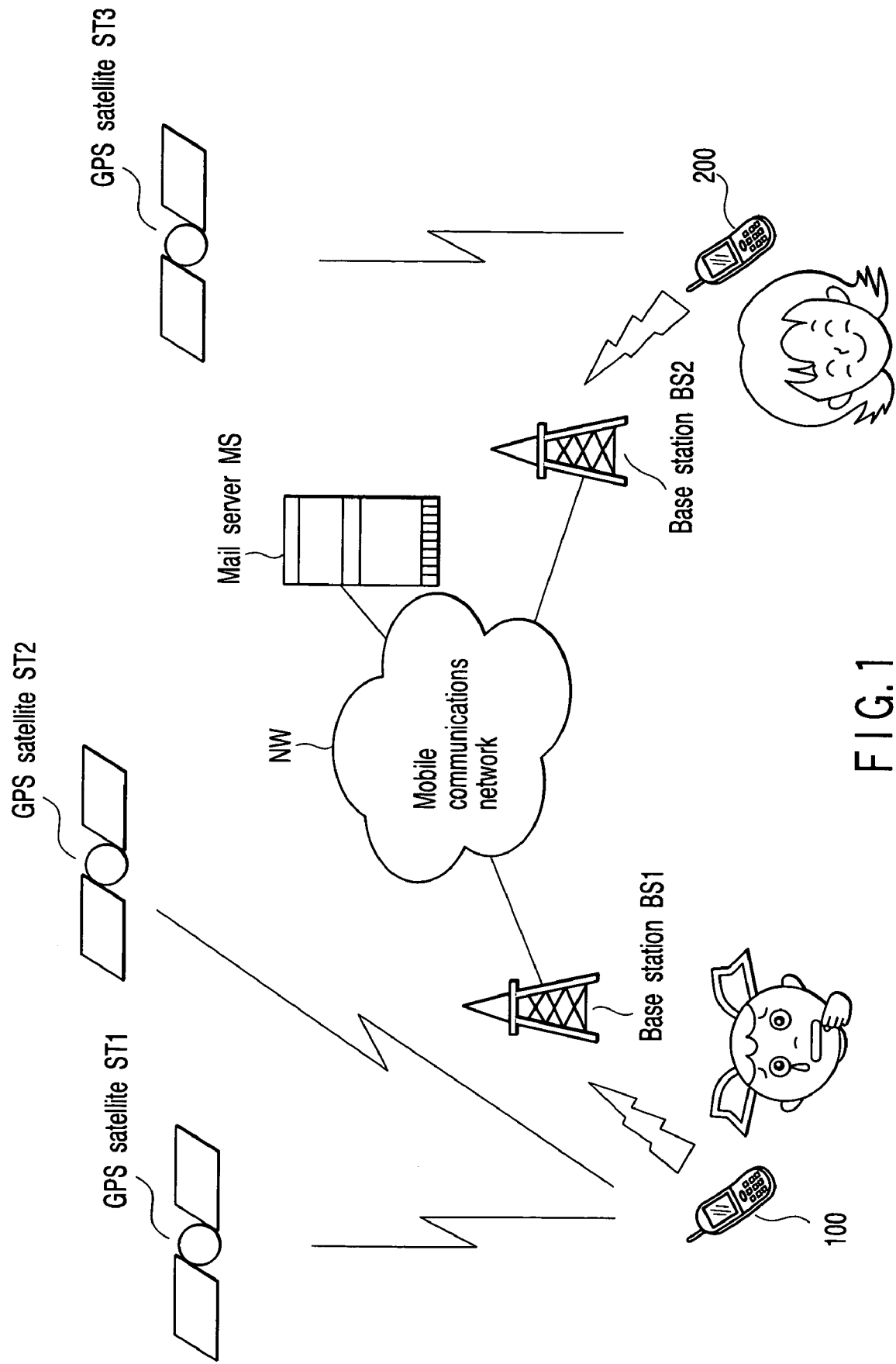
FIG. 1 shows an illustration of a configuration of a mobile communications system according to an embodiment of the present invention.

FIG. 1 illustrates a configuration of a mobile communications system according to an embodiment of the present invention. The mobile communications system comprises cellular telephones 100, 200, base stations BS1, BS2, a mobile communications network NW, and a mail server MS. In an example illustrated in FIG. 1, the cellular telephones 100, 200 have the same configuration as each other. In general, the cellular telephone 100 may be carried by a child and the cellular telephone 200 may be carried by his or her parent, but the carrying manner is not limited to this.

The cellular telephone 100 makes radio communications with the nearest base station BS1 while the cellular telephone 200 makes radio communications with the nearest base station BS2. The cellular telephones 100, 200 establish communications link via the nearest base stations BS1, BS2 and the mobile communications network NW to execute speech communications.

Each of the cellular telephones 100, 200 has an e-mail sending/receiving function. A mail sent from the cellular telephones 100, 200 is temporarily stored in the mail server MS via the base stations BS1, BS2 and the mobile communications network NW, and is transferred to a destination of the e-mail or set to the destination in response to a request of the destination by the mail server MS. The base stations BS1, BS2 receive an e-mail for themselves from the mail server MS via the nearest base stations BS1, BS2 and the mobile communications network NW.

Next, the configuration of the cellular telephones 100, 200 is described with reference to FIG. 2. Each of the cellular telephones 100, 200 comprises an antenna 101, a communications unit 110, a speech processing unit 120, a display unit 130, an operation unit 140, a notification unit 150, a memory unit 160, a GPS positioning unit 170, a timer unit 180, and a control unit 190.

The antenna 101 is employed to receive a radio signal sent from the base station BS1 or BS2 and send a radio signal for the base station BS1 or BS2 from the cellular telephone.

The communications unit 110 conducts radio communications with the base station BS1 or BS2 via the antenna 101. More specifically, the communications unit 110 downconverts and demodulates the radio signal received by the antenna 101, and obtains encoded speech data sent from a communications partner station or e-mail data sent from the mail server MS. In addition, the communications unit 110 modulates a baseband signal by using encoded speech data and e-mail data supplied from the speech processing unit 120 via the control unit 190, generates a radio signal by upconverting the modulated baseband signal, and sends the radio signal to the base station via the antenna 101.

The speech processing unit 120 reproduces a speech signal by decoding the encoded speech data demodulated by the communications unit 110 and outputs the speech signal from a built-in speaker 121. The speech sent from the communications partner station is thereby transmitted to the user. In addition, the speech processing unit 120 generates encoded speech data by encoding a speech signal input from a built-in microphone 122 and supplies the encoded speech data to the communications unit 110 via the control unit 190.

The display unit 130 is a display device employing a LCD (Liquid Crystal Display), etc. and displays various kinds of visual information such as texts, images, etc. to the user. The operation unit 140 comprises a plurality of key switches to accept user requests. The notification unit 150 notifies the user of reception of incoming calls by sounds.

The memory unit 160 stores control programs and control data of the control unit 190, and address book data associated with telephone numbers, names and image data such as face pictures, etc. and also stores mail data of the previously sent and received mails, explanation data about the settings of the cellular telephones, etc.

Figures 2, 3:
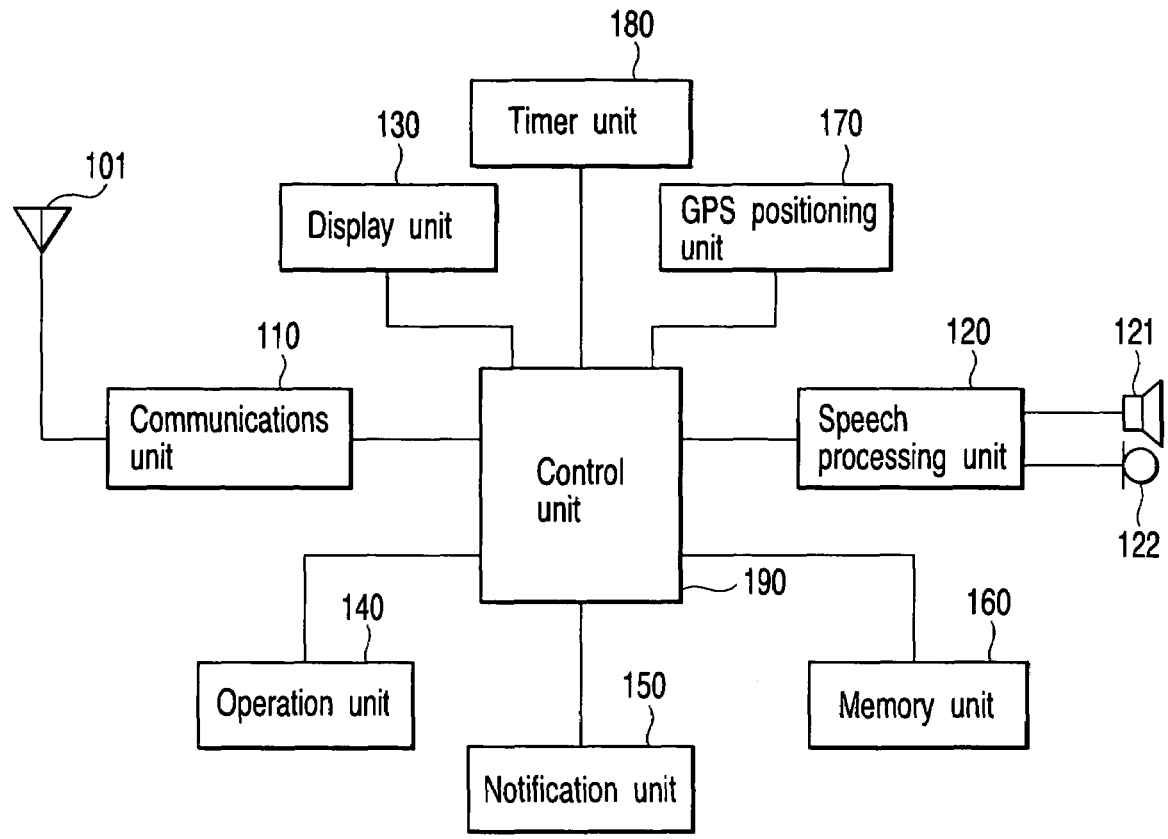
FIG. 2 shows a block diagram of a configuration of a cellular telephone employed in the mobile communications system shown in FIG. 1.
FIG. 3 shows a location notification address table to be stored in a memory unit of the cellular telephone shown in FIG. 2.

In addition, the memory unit 160 stores a location notification address table shown in FIG. 3, a location information table shown in FIG. 4, and a notification place table shown in FIG. 5. The location notification address table is a table associated with names of destinations of the location information, e-mail addresses thereof, and confirmation reject setting thereof. The location information table is a table associated with location information represented by the north latitude and the east longitude (altitude if necessary) and the positioning accuracy thereof, and the time when the information has been acquired. The notification place table is a table associated with names of the locations, the location information thereof, departure notification times and arrival notification times.

The GPS positioning unit 170 receives a plurality of signals (hereinafter called GPS signals) to obtain the location information transmitted from, for example, GPS satellites ST1, ST2, ST3, etc. shown in FIG. 1, calculates the location information on the basis of the information included in the signals and the location information of the GPS satellites, and obtains the location of the cellular telephone.

In addition, calculation of the location information may execute in exterior computer or exterior server, and the cellular telephone 100 receives the location information calculated in the computer or the server.

In addition, the GPS positioning unit 170 obtains the positioning accuracy of the location information acquired by the positioning. The positioning accuracy can be acquired by referring to the number of signals obtained from the GPS satellites ST1 to ST3. The positioning accuracy is classified to LEVEL 1 at which the error is less than 50 meters (considered as the best accuracy in a case where, for example, signals are obtained from all the GPS satellites ST1 to ST3), LEVEL 2 at which the error is less than 300 meters (in a case where, for example, signals are obtained from two of the GPS satellites ST1 to ST3), and LEVEL 3 at which the error is not less than 300 meters (in a case where, for example, signals are obtained from one of the GPS satellites ST1 to ST3).

FIG. 1 illustrates three GPS satellites. To obtain a high positioning accuracy, however, the number or GPS satellites should be preferably four or more. The positioning accuracy may be enhanced by employing an angular speed sensor and an acceleration sensor together as additional functions.

The timer unit 180 comprises a function for measuring the time and a timer function for counting the time designated by the control unit 190.

The control unit 190 controls all the units of the cellular telephone. For example, the control unit 190 comprises an incoming call control function for receiving an incoming call, an outgoing call control function for making an outgoing call in a case where the cellular telephones accepts a request for outgoing call from the user, a communications control function for establishing a communications link with the communications partner, sending/receiving the speech data and inputting/outputting the speech at the incoming/outgoing call control time, and an e-mail sending/receiving control function.

Besides these functions, the control unit 190 comprises an easy location mail function for sending the location information by e-mail with easy operations, a location notification mail function for sending the location information in response to an e-mail request, and a departure/arrival notification mail function for notifying by e-mail that the cellular telephone holder has departed from a registered location or arrived thereat at a preset time. These functions will be described later.

The positioning (reception of the GPS information, operation of the location information) of the GPS positioning unit 170 is also executed periodically without instructions from the control unit 190. The control unit 190 is notified of the location information obtained by the positioning and the positioning accuracy thereof. The control unit 190 associates the location information and the positioning accuracy with the time measured by the timer unit 180, which is regarded as a positioning time, and thereby updates a current location in the location information table (FIG. 4) of the memory unit 160.

Next, operations of the cellular telephone 200 are explained. In the following descriptions, the conventional control operation relating to the speech operations and the conventional control operation relating to sending/receiving mails are omitted, and the easy location mail function, the location notification mail function and the departure/arrival notification mail function are described.

Figure 6:
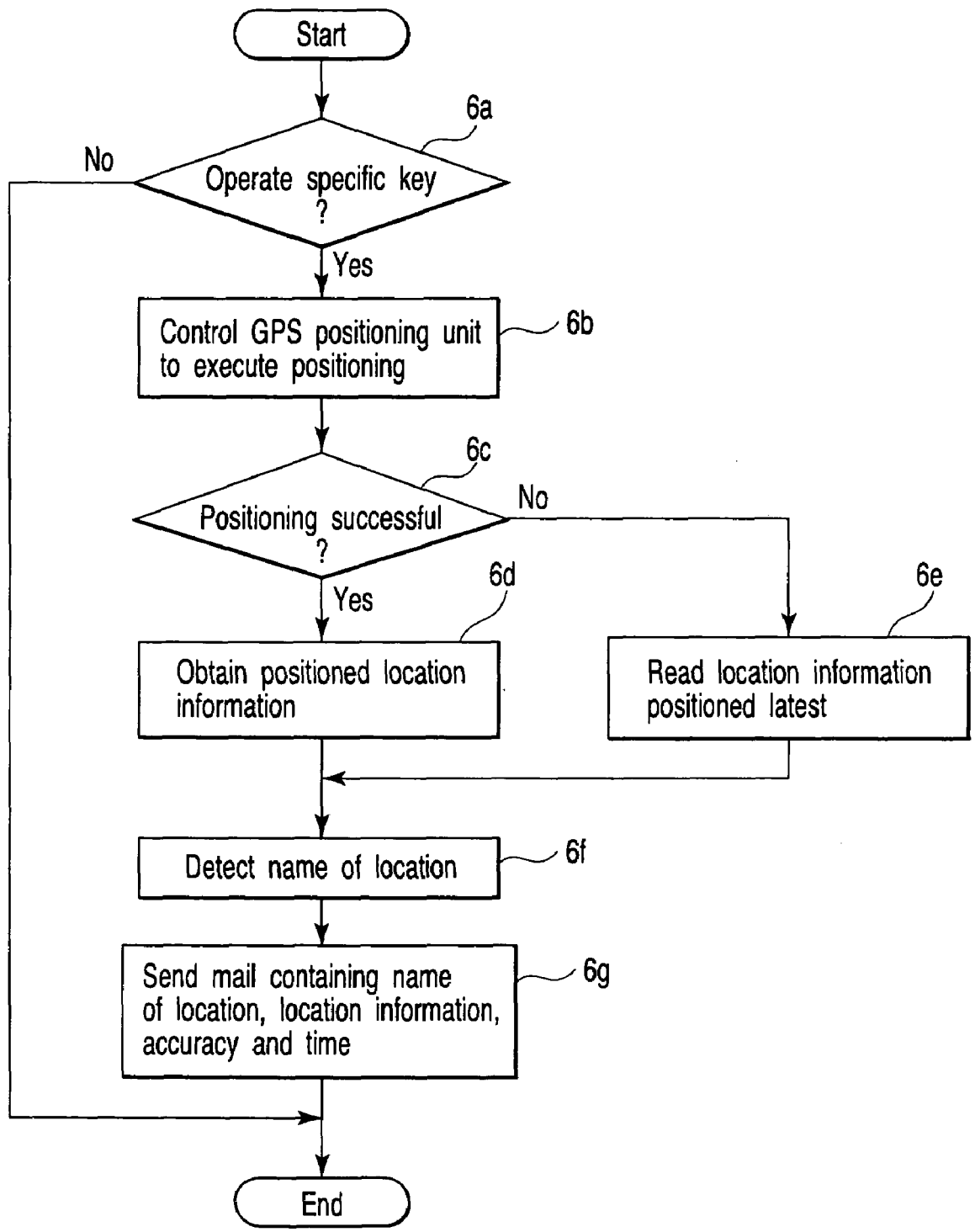
FIG. 6 shows a flowchart of operations of controlling an easy location mail function of the cellular telephone shown in FIG. 2.

The operations of the easy location mail function are described with reference to FIG. 6. FIG. 6 shows a flowchart of a control flow of the control unit 190 relating to the easy location mail function. If the cellular telephone is turned on, the processing shown in FIG. 6 is repeated until the cellular telephone is turned off. Even if the cellular telephone is turned off, the processing relating to the flowchart may be accepted.

In step 6a, the control unit 190 discriminates whether or not a specific key of the operation unit 140 has been operated. If the control unit 190 discriminates that the specific key has been operated, the control unit 190 shifts to step 6b. If the control unit 190 discriminates that the specific key has not been operated, the control unit 190 ends the processing and executes step 6a again.

As an example of the specific key in step 6a, in the cellular telephone which can be modified to be a closed state or an open state, a key provided to be operable even in the closed state is considered. When the holder pushes down the key for more than a certain period of time, the control unit 190 discriminates that the specific key has been operated, and shifts to step 6b. According to this, the position information can be sent even if the cellular telephone is in the closed state. Instead of this, however, two or more keys may be pushed down for more than a certain period of time (or simply pushed down) or a plurality of keys may be pushed down in a predetermined order.

The control unit 190 controls the GPS positioning unit 170 to execute positioning in step 6b, and shifts to step 6c. The GPS positioning unit 170 thereby receives the GPS signals transmitted from the GPS satellites ST1 to ST3, executes the positioning operation on the basis of the information included in the signals and obtains the location information of the cellular telephone and the positioning accuracy thereof.

When the cellular telephone is located indoors or underground, the cellular telephone often fails positioning since the cellular telephone cannot receive the GPS signals. In this case, the GPS positioning unit 170 may continue positioning until the GPS positioning unit 170 receives a request for outputting the location information from the control unit 190 or may urge the display unit 130 to display the matter that the positioning cannot be executed.

In step 6c, the control unit 190 discriminates whether or not the positioning in step 6b has been successfully executed. To discriminate the success in the positioning, the control unit 190 requests the GPS positioning unit 170 to output the location information. If the control unit 190 receives a response to the request (i.e. output of the location information) from the GPS positioning unit 170, the control unit 190 discriminates that the positioning has been successfully executed. If the control unit 190 does not receive a response to the request, the control unit 190 discriminates that the positioning has been failed. If the positioning has been successfully executed, the control unit 190 shifts to step 6d. If the positioning has been failed, the control unit 190 shifts to step 6e.

In step 6d, the control unit 190 obtains the location information and the positioning accuracy thereof from the GPS positioning unit 170 and the time information indicating a current time from the timer unit 180, and updates the information stored in the location information table (FIG. 4) of the memory unit 160, of the obtained information. Then the control unit 190 shifts to step 6f.

In step 6e, the control unit 190 reads the location information, the positioning accuracy thereof and the time information from the location information table of the memory unit 160. Then the control unit 190 shifts to step 6f.

In step 6f, the control unit 190 detects the name of the location (for example, "school", "park", "crammer") in which the cellular telephone exists, on the basis of the information (location information, positioning accuracy thereof and time information) obtained in step 6d or the information (location information, positioning accuracy thereof and time information) read in step 6e, and on the basis of the notification place table (FIG. 5) of the memory unit 160. Then the control unit 190 shifts to step 6g. The detection of the location name is executed by comparing the location information with the location information stored in the notification place table. However, the values of the location information do not need to match completely. If a difference between the values is within a preset error, the control unit 190 discriminates that the cellular telephone exists in the location.

In step 6g, the control unit 190 composes an mail containing in a text thereof the location name detected in step 6f, the information (location information, positioning accuracy thereof and time information) obtained in step 6d or the information (location information, positioning accuracy thereof and time information) read in step 6e. In addition, the control unit 190 sets the e-mail address registered in the location notification address table (FIG. 3) of the memory unit 160 as the mail destination and controls the communications unit 110 to send the composed mail to the destination and ends this processing.

The control unit 190 sets the e-mail address registered in the location notification address table (FIG. 3) of the memory unit 160 as the mail destination, immediately before step 6f. Then the control unit 190 may control the communications unit 110 to send the information such as the location information, accuracy, time, etc. and end the processing.

If the positioning is failed, the control unit 190 reads the latest positioned information stored in the location information table of the memory unit 160 and sends the e-mail including the information based on the latest positioned information. Instead of this, however, the control unit 190 may compose and send an e-mail containing in a text thereof the fact that the positioning is failed, without using the latest positioned information.

According to the cellular telephone having the above-described configuration, when the holder operates the specific key of the operation unit 140, the e-mail containing in a text thereof the name of the location of the cellular telephone, the location information, positioning accuracy and the positioning time is composed and sent to the mail address registered in the location notification address table. For this reason, even if the holder is an aged person, a handicapped person or a child or if the holder is involved in a disaster or is in a state of being unable to make complicated operations due to sudden illness, the holder can notify a specific person of the location information by easy and simple operations.

Figure 7A:
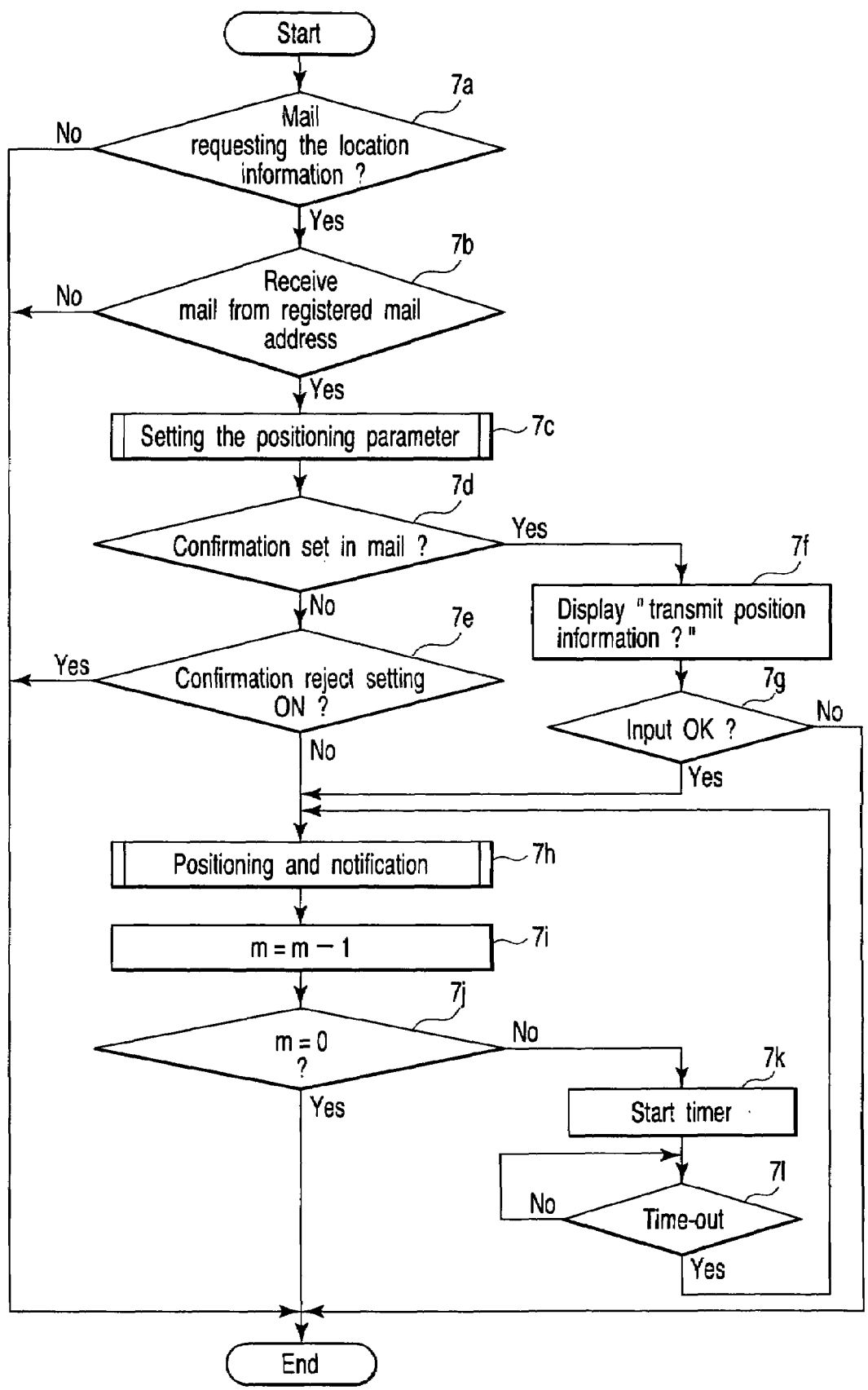
FIG. 7A shows a flowchart of operations of controlling a location notification mail function of the cellular telephone shown in FIG. 2.
Figure 7B:
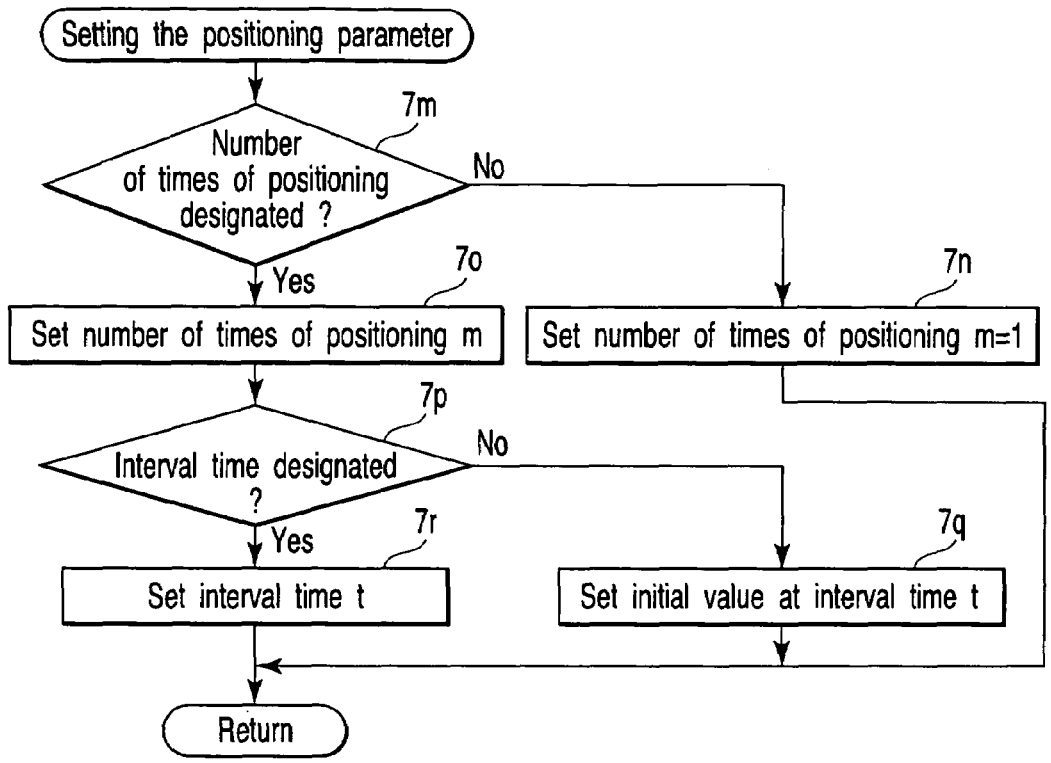
FIG. 7B shows a flowchart of operations of controlling the location notification mail function of the cellular telephone shown in FIG. 2.
Figure 7C:
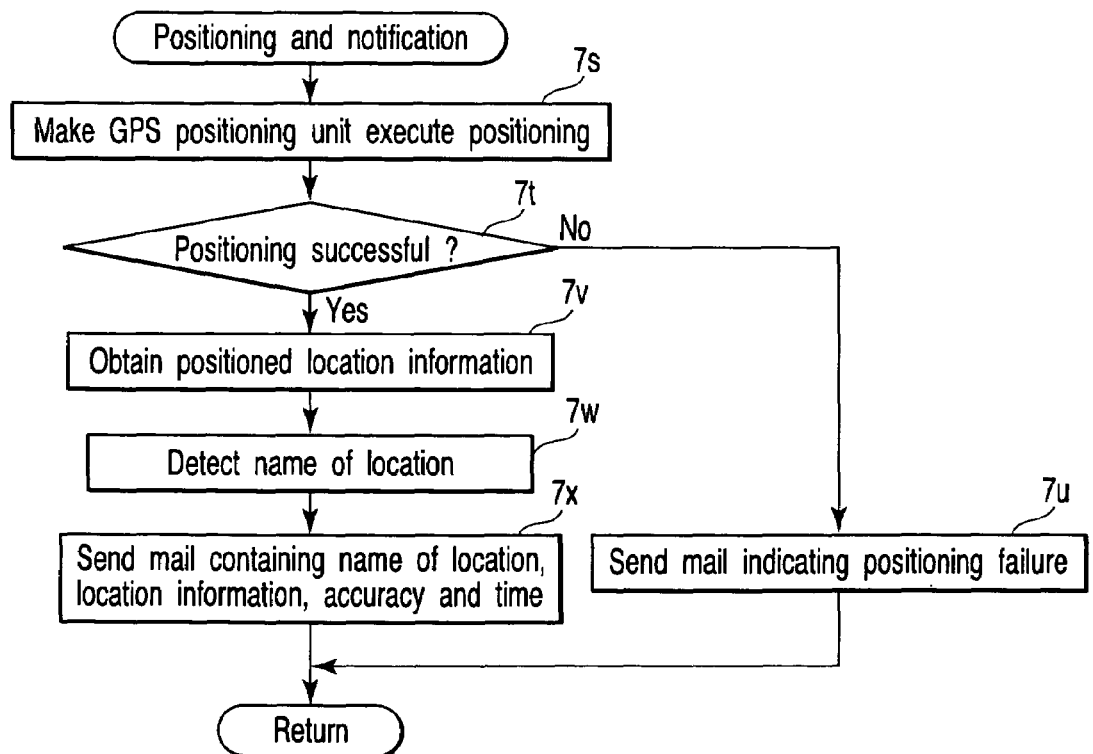
FIG. 7C shows a flowchart of operations of controlling the location notification mail function of the cellular telephone shown in FIG. 2.

Next, the operations of the location notification mail function are described with reference to FIG. 7A, FIG. 7B and FIG. 7C. FIG. 7A, FIG. 7B and FIG. 7C are flowcharts of the control flow of the control unit 190 relating to the location notification mail function. The processing shown in the drawings is executed when the cellular telephone receives an e-mail.

A person who wishes to know the location of the cellular telephone sends an e-mail to request the location information, to the cellular telephone from the other cellular telephone (for example, cellular telephone 100). At this time, for example, a preset keyword such as "location request", etc., the number of times of positioning, and the interval time are set in a "subject" of the e-mail.

For example, "location request mail 0410" requesting the location information, indicates that the number of times of positioning is "4" and that the positioning should be executed in every "10" minutes. In addition, a keyword such as "confirmation request" is set in the subject of the e-mail to confirm that the location information is sent.

First, in step 7a, the control unit 190 discriminates whether or not the received mail is an e-mail requesting the location information. This discrimination is based on whether or not the character string such as the preset keyword "location request" is set in the subject of the received mail. If the keyword is set in the subject, i.e. if the received mail is an e-mail requesting the location information, the control unit 190 shifts to step 7b. If the keyword is not set in the subject, i.e. if the received mail is not an e-mail requesting the location information, the control unit 190 discriminates that the received mail is a general mail and ends the processing.

The discrimination of the e-mail requesting the location information does not need to be executed on the basis of the setting of the keyword, but may be based on the first character (pictogram or symbol) in the text, the last character (pictogram or symbol) in the text, an ON/OFF state of a preset flag, and presence or absence of a predetermined attachment.

For example, the discrimination of the e-mail based on the ON/OFF state of a preset flag is executed in the following manner. A menu for setting the sending of a "mail requesting the location information" or a general mail is prepared in the cellular telephone 100 of the sending side. If the "mail requesting the location information" is set by the menu, the control unit 190 of the cellular telephone 100 is considered to send the e-mail with information for setting a flag corresponding to the setting to be ON. The control unit 190 of the cellular telephone 200 on the recipient side discriminates whether or not the received mail is the e-mail requesting the location information by discriminating whether the flag is ON or OFF.

In step 7b, the control unit 190 discriminates whether or not a mail address of the sender sending the e-mail is registered in the location notification address table (FIG. 3). If the mail address of the sender is registered, the control unit 190 shifts to step 7c. If the mail address of the sender is not registered, the control unit 190 regards the received mail as a general mail and ends the processing.

In step 7c, the control unit 190 executes setting of the positioning parameter as shown in FIG. 7B. First, in step 7m, the control unit 190 discriminates whether or not a numerical value designating the number of times of the positioning is set in the subject of the received mail. If the numerical value designating the number of times of the positioning is set, the control unit 190 shifts to step 7o. If the numerical value designating the number of times of the positioning is not set, the control unit 190 shifts to step 7n.

In step 7n, the control unit 190 sets "1" as a parameter m representing the number of times of positioning and stores the value in the memory unit 160. Then the control unit 190 shifts to step 7d of FIG. 7A.

In step 7o, the control unit 190 sets a numerical value designated in the subject of the received mail as the parameter m representing the number of times of positioning and stores the value in the memory unit 160. Then the control unit 190 shifts to step 7p.

In step 7p, the control unit 190 discriminates whether or not a numerical value designating the interval time is set in the subject of the received mail. If the numerical value designating the interval time is set, the control unit 190 shifts to step 7r. If the numerical value designating the interval time is not set, the control unit 190 shifts to step 7q.

In step 7q, the control unit 190 sets a preset initial value as a parameter t representing the interval time and stores the initial value in the memory unit 160. Then the control unit 190 shifts to step 7d of FIG. 7A.

In step 7r, the control unit 190 sets the numerical value designated in the subject of the received mail, as the parameter t representing the interval time and stores the initial value in the memory unit 160. Then the control unit 190 shifts to step 7d of FIG. 7A.

In step 7d of FIG. 7A, the control unit 190 discriminates whether or not the received mail is an e-mail in which the confirmation request is set. This confirmation is based on whether or not the preset character string such as the keyword "confirmation request" is set in the subject of the received mail. If the keyword is set in the subject of the received mail, i.e. if the received mail is an e-mail in which the confirmation request is set, the control unit 190 shifts to step 7f. If the keyword is not set in the subject of the received mail, i.e. if the received mail is an e-mail in which the confirmation request is set, the control unit 190 shifts to step 7e.

The discrimination of the e-mail requesting the location information does not need to be executed on the basis of the setting of the keyword, but may be based on the first character (pictogram or symbol) in the text, the last character (pictogram or symbol) in the text, an ON/OFF state of a preset flag, and presence or absence of a predetermined attachment.

For example, the discrimination of the e-mail based on the ON/OFF state of a predetermined flag is executed in the following manner. First, a menu for selecting an e-mail "to request confirmation" or an e-mail "not to request confirmation" as the e-mail requesting the location information, is prepared in the cellular telephone 100 of the sending side. If the e-mail "to request confirmation" is set by the menu, the control unit 190 of the cellular telephone 100 is considered to send the e-mail with information for setting a flag corresponding to the setting to be ON. The control unit 190 of the cellular telephone 200 on the recipient side discriminates whether or not the e-mail requesting the location information is the e-mail "to request confirmation" or the e-mail "not to request confirmation", by discriminating whether the flag is ON or OFF on the basis of the received mail.

In step 7e, the control unit 190 discriminates whether or not confirmation reject setting "ON" is associated with the mail address of the sender sending the e-mail, by referring to the location notification address table (FIG. 3). If the confirmation reject setting is "ON", the control unit 190 discriminates that the holder rejects sending the location information to the sender and ends the processing. If the confirmation reject setting is "OFF", the control unit 190 discriminates that the holder does not rejects sending the location information to the sender and continues the processing.

On the other hand, in step 7f, the control unit 190 controls the display unit 130 to display "transmit location information to "xxx"?" and ask the holder if the location information may be transmitted. Then the control unit 190 shifts to step 7g. Character strings ("papa", "mama", etc.) set in the "designation" of the location notification address table are displayed in "xxx".

In step 7g, the control unit 190 accepts the holder's opinion as to whether or not sending the location information is permitted by the operation unit 140. If the holder determines that the location information may be sent to "xxx", the control unit 190 shifts to step 7h such that the holder makes an operation to permit the location information to be sent. If the holder does not wish to send the location information to "xxx", the control unit 190 ends the processing such that the holder makes an operation to reject sending the location information.

In step 7h, the control unit 190 executes positioning and notification as shown in FIG. 7C. First, the control unit 190 controls the GPS positioning unit 170 to execute the positioning in step 7s and then shifts to step 7t. The GPS positioning unit 170 thereby receives the GPS signals transmitted from the GPS satellites ST1 to ST3, executes the positioning operation on the basis of the information included in the signals, and obtains the location of the cellular telephone and the positioning accuracy.

When the cellular telephone is located indoors or underground, the cellular telephone often fails positioning since the cellular telephone cannot receive the GPS signals. In this case, the GPS positioning unit 170 may continue positioning until the GPS positioning unit 170 receives a request for outputting the location information from the control unit 190 or may urge the display unit 130 to display the matter that the positioning cannot be executed.

In step 7t, the control unit 190 discriminates whether or not the positioning in step 7s has been successfully executed. To discriminate the success in the positioning, the control unit 190 requests the GPS positioning unit 170 to output the location information. If the control unit 190 receives a response to the request (i.e. output of the location information) from the GPS positioning unit 170, the control unit 190 discriminates that the positioning has been successfully executed. If the control unit 190 does not receive a response to the request, the control unit 190 discriminates that the positioning has been failed. If the positioning has been successfully executed, the control unit 190 shifts to step 7v. If the positioning has been failed, the control unit 190 shifts to step 7u.

In step 7u, the control unit 190 composes an e-mail containing in a text thereof the matter that the positioning has been failed, sets the mail address of the received mail as the mail destination, and controls the communications unit 110 to send the composed mail to the destination. The control unit 190 shifts to step 7i of FIG. 7A.

In step 7u, the control unit 190 may read the location information, the positioning accuracy thereof and the time information from the location information table of the memory unit 160 and shift to step 7w. In this case, shifting to step 7w is executed on the basis of the latest positioned information.

In step 7v, the control unit 190 obtains the location information and the positioning accuracy thereof from the GPS positioning unit 170 and the time information indicating a current time from the timer unit 180, and updates the information stored in the location information table (FIG. 4) of the memory unit 160, of the obtained information. Then the control unit 190 shifts to step 7w.

In step 7w, the control unit 190 detects the name of the location (for example, "school", "park", "crammer") in which the cellular telephone exists, on the basis of the information (location information, positioning accuracy thereof and time information) obtained in step 7v and the notification place table (FIG. 5) of the memory unit 160. Then the control unit 190 shifts to step 7x. The detection of the location name is executed by comparing the location information with the location information stored in the notification place table. However, the values of the location information do not need to match completely. If a difference between the values is within a preset error, the control unit 190 discriminates that the cellular telephone exists in the location.

In step 7x, the control unit 190 composes an e-mail containing in a text thereof the location name detected in step 7w and the information (location information, positioning accuracy thereof and time information) obtained in step 7v. In addition, the control unit 190 sets the mail address of the received mail as an e-mail destination, and controls the communications unit 110 to send the composed mail to the destination. The control unit 190 shifts to step 7i of FIG. 7A.

The control unit 190 sets the mail address registered in the location notification address table (FIG. 3) of the memory unit 160 as the mail destination, immediately before step 7w. Then the control unit 190 may control the communications unit 110 to send the information such as the location information, accuracy, time, etc.

In step 7i of FIG. 7A, the control unit 190 reads the parameter m indicating the number of times of positioning from the memory unit 160, and updates the parameter m by subtracting "1" therefrom. The control unit 190 stores the updated parameter m in the memory unit 160, and shifts to step 7j.

In step 7j, the control unit 190 discriminates whether or not the updated parameter is "0", i.e. whether or not the number of times of positioning has reached the number of times designated by the received mail. If the number of times of positioning is "0", i.e. if the number of times of positioning has reached the designated number of times, the control unit 190 ends the processing. If the number of times of positioning has not reached the designated number of times, the control unit 190 shifts to step 7k.

In step 7k, the control unit 190 sets the interval time t that has been set by the positioning parameter setting of step 7c, at the timer unit 180, and activates the timer function of the timer unit 180 to start the timer. The control unit 190 shifts to step 7l.

In step 7l, the control unit 190 discriminates whether or not the timer which has started in step 7k is on time-out. If the timer is on time-out, the control unit 190 shifts to step 7h and newly executes positioning. If the timer is not on time-out, the control unit 190 discriminates again whether or not the timer is time-out.

As described above, if the cellular telephone having the above-described configuration receives an e-mail from the address registered in the location notification address table, the cellular telephone composes an e-mail in which the sender of the received mail is set as the mail destination, and sends the composed mail thereto together with the name of location of the cellular telephone, location information, positioning accuracy and the positioning time contained therein.

For this reason, even if the holder is an aged person, a handicapped person or a child or if the holder is involved in a disaster or is in a state of being unable to make complicated operations due to sudden illness, the holder can notify the mail recipient of the location information by sending the e-mail to the cellular telephone. The location of the holder can be thereby recognized.

In addition, if the keyword "confirmation request" is not set in the subject of the received mail, the location information is sent to the sender who has sent the e-mail, in accordance with the settings of the cellular telephone, as shown in FIG. 8. On the other hand, if the keyword "confirmation request" is set in the subject of the received mail, the location information is sent to the sender who has sent the e-mail, by permission of the holder, irrespective of the settings of the location notification address table. For this reason, the sender can obtain the location information while considering the holder's privacy. As a result, since the location information can be sent to the only sender registered in the location notification address table shown in FIG. 3, the location information cannot be obtained by a third party.

Figure 9:
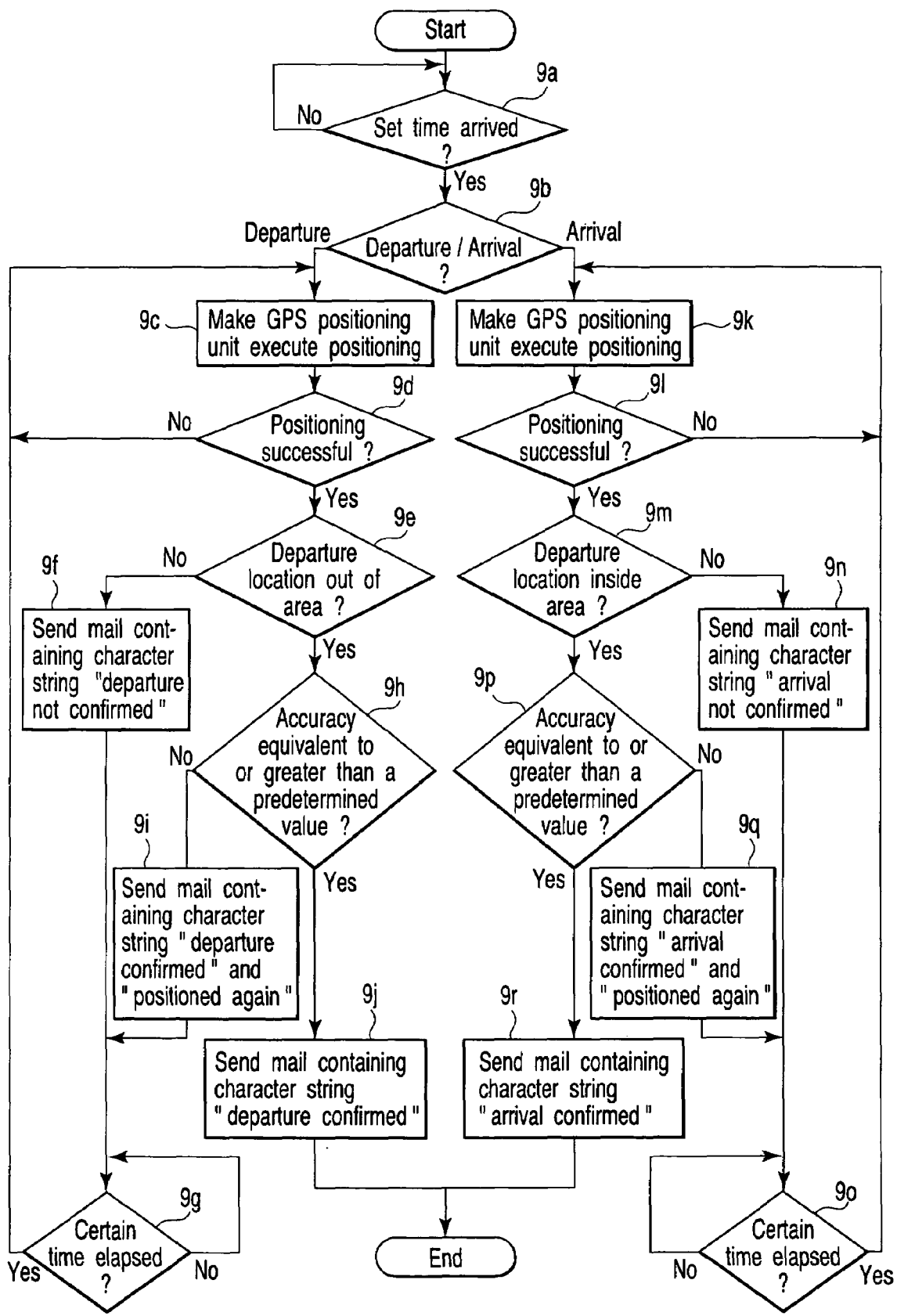
FIG. 9 shows a flowchart of operations of controlling a departure/arrival notification mail function of the cellular telephone shown in FIG. 2.

Next, the operations of the departure/arrival notification mail function are described with reference to FIG. 9. FIG. 9 is a flowchart showing a control flow of the control unit 190 in relation to the departure/arrival notification mail function. If the cellular telephone is turned on, the processing of FIG. 9 is repeated until the cellular telephone is turned off. Even if the cellular telephone is turned off, the processing relating to the flowchart may be accepted.

First, in step 9a, the control unit 190 compares the current time measured by the timer unit 180 with the departure notification time and the arrival notification time set in the notification location table shown in FIG. 5, and discriminates whether or not a time matching both the times has arrived. If the current time measured by the timer unit 180 matches the departure notification time or the arrival notification time, the control unit 190 shifts to step 9b. If the current time measured by the timer unit 180 does not match the departure notification time or the arrival notification time, the control unit 190 continues monitoring the times again in step 9a.

In step 9b, the control unit 190 discriminates whether the time matching in step 9a is the departure notification time or the arrival notification time. If the current time matches the departure notification time, the control unit 190 shifts to step 9c. If the current time matches the arrival notification time, the control unit 190 shifts to step 9k.

The control unit 190 controls the GPS positioning unit 170 to execute positioning in step 9c, and then shifts to step 9d. The GPS positioning unit 170 thereby receives the GPS signals transmitted from the GPS satellites ST1 to ST3, executes the positioning operation on the basis of the information included in the signals, obtains the location of the cellular telephone and the positioning accuracy thereof, and notifies the control unit 190 of the location of the cellular telephone and the positioning accuracy thereof.

If the control unit 190 is notified of the location of the cellular telephone and the positioning accuracy thereof, the control unit 190 detects the current time of the timer unit 180 as a positioning time. When the cellular telephone is located indoors or underground, the cellular telephone often fails positioning since the cellular telephone cannot receive the GPS signals.

In step 9d, the control unit 190 discriminates whether or not the positioning in step 9c has been successfully executed. The control unit 190 discriminates that the positioning has been successfully executed if the location information is input from the GPS positioning unit 170, or discriminates that the positioning has been failed if the location information is not input. If the positioning has been successfully executed, the control unit 190 detects the current time of the timer unit 180 as the positioning time, and then shifts to step 9e. If the positioning has been failed, the control unit 190 shifts to step 9c to make the GPS positioning unit 170 execute positioning again.

In step 9e, the control unit 190 refers to the notification location table and detects the location name corresponding to the current time. The control unit 190 compares the location information corresponding to the detected location name with the location information positioned in step 9d, and confirms that both the location information items do not match. If the control unit 190 discriminates that both the location information items do not match, i.e. if the cellular telephone is not located in the vicinity of the location name, the control unit 190 shifts to step 9h. If the control unit 190 discriminates that both the location information items match, i.e. if the cellular telephone is located in the vicinity of the location name, the control unit 190 shifts to step 9f.

The confirmation is executed by comparing the two location information items, but it is considered that they often do not match due to the positioning accuracy, etc. For this reason, if a difference between location information items is within a preset error, the control unit 190 discriminates that both the location information items match and that cellular telephone exists in the location. If the difference between location information items is greater than a preset error, the control unit 190 discriminates that the location information items do not match, i.e. that cellular telephone does not exist in the location. The discrimination accuracy may be improved by varying the error by the control unit 190 in accordance with the kind of the location name and the positioning accuracy.

In step 9f, the control unit 190 composes an e-mail containing in a text thereof a character string "not yet departed from "xxx"", the information (location information and positioning accuracy) obtained in step 9c, and the positioning time detected in step 9d. The location name (for example, "school", "park", "crammer") detected in step 9e is set as the character string "xxx". In addition, the control unit 190 sets the mail address registered in the location notification address table (FIG. 3) of the memory unit 160 as a destination of the composed mail. The control unit 190 controls the communications unit 110 to send the e-mail to the destination, and shifts to step 9g.

In step 9g, the control unit 190 monitors the time measured by the timer unit 180 and stands by until a certain time elapses. When a certain time has elapsed, the control unit 190 shifts to step 9c to execute positioning again.

In step 9h, the control unit 190 discriminates whether or not the positioning accuracy of the location information obtained in step 9c is equivalent to or greater than a predetermined value (for example, level 1 as the best accuracy). If the control unit 190 discriminates that the positioning accuracy is equivalent to or greater than the predetermined value (for example, level 1), the control unit 190 shifts to step 9j. If the control unit 190 discriminates that the positioning accuracy is smaller than the predetermined value (for example, level 2 or level 3), the control unit 190 shifts to step 9i.

In step 9i, the control unit 190 composes an e-mail containing in a text thereof a character string "considered to have already departed from "xxx" but positioned again after "ΔΔ" minutes due to bad accuracy", the information (location information and positioning accuracy) obtained in step 9c, and the positioning time detected in step 9d.

The location name (for example, "school", "park", "crammer") detected in step 9e is set as the character string "xxx". The time corresponding to "ΔΔ" represents a time based on the certain time of step 9g. The control unit 190 sets the mail address registered in the location notification address table (FIG. 3) of the memory unit 160 as a destination of the composed mail. The control unit 190 controls the communications unit 110 to send the e-mail to the destination. After that, the control unit 190 shifts to step 9g.

On the other hand, in step 9j, the control unit 190 composes an e-mail containing in a text thereof a character string "already departed from "xxx"", the information (location information and positioning accuracy) obtained in step 9c, and the positioning time detected in step 9d. The location name (for example, "school", "park", "crammer") detected in step 9e is set as the character string "xxx". The control unit 190 sets the mail address registered in the location notification address table (FIG. 3) of the memory unit 160 as a destination of the composed mail. The control unit 190 controls the communications unit 110 to send the e-mail to the destination sand ends the processing.

The control unit 190 controls the GPS positioning unit 170 to execute positioning in step 9k, and then shifts to step 9l. The GPS positioning unit 170 thereby receives the GPS signals transmitted from the GPS satellites ST1 to ST3, executes the positioning operation on the basis of the information included in the signals, obtains the location of the cellular telephone and the positioning accuracy thereof, and notifies the control unit 190 of the location of the cellular telephone and the positioning accuracy thereof. When the cellular telephone is located indoors or underground, the cellular telephone often fails positioning since the cellular telephone cannot receive the GPS signals.

In step 9l, the control unit 190 discriminates whether or not the positioning in step 9k has been successfully executed. The control unit 190 discriminates that the positioning has been successfully executed if the location information is input from the GPS positioning unit 170, or discriminates that the positioning has been failed if the location information is not input. If the positioning has been successfully executed, the control unit 190 detects the current time of the timer unit 180 as the positioning time, and then shifts to step 9m. If the positioning has been failed, the control unit 190 shifts to step 9k to make the GPS positioning unit 170 execute positioning again.

In step 9m, the control unit 190 refers to the notification location table and detects the location name corresponding to the current time. The control unit 190 compares the location information corresponding to the detected location name with the location information positioned in step 9i, and confirms that both the location information items do not match. If the control unit 190 discriminates that both the location information items do not match, i.e. if the cellular telephone is not located in the vicinity of the location name, the control unit 190 shifts to step 9n. If the control unit 190 discriminates that both the location information items match, i.e. if the cellular telephone is located in the vicinity of the location name, the control unit 190 shifts to step 9p.

The confirmation is executed by comparing the two location information items, but it is considered that they often do not match due to the positioning accuracy, etc. For this reason, if a difference between location information items is within a preset error, the control unit 190 discriminates that both the location information items match and that cellular telephone exists in the location. If the difference between location information items is greater than a preset error, the control unit 190 discriminates that the location information items do not match, i.e. that cellular telephone does not exist in the location. The discrimination accuracy may be improved by varying the error by the control unit 190 in accordance with the kind of the location name and the positioning accuracy.

In step 9n, the control unit 190 composes an e-mail containing in a text thereof a character string "not yet arrived at "xxx"", the information (location information and positioning accuracy) obtained in step 9k, and the positioning time detected in step 9l. The location name (for example, "school", "park", "crammer") detected in step 9m is set as the character string "xxx". In addition, the control unit 190 sets the mail address registered in the location notification address table (FIG. 3) of the memory unit 160 as a destination of the composed mail. The control unit 190 controls the communications unit 110 to send the e-mail to the destination, and shifts to step 9o.

In step 9o, the control unit 190 monitors the time measured by the timer unit 180 and stands by until a certain time elapses. When a certain time has elapsed, the control unit 190 shifts to step 9k to execute positioning again.

In step 9p, the control unit 190 discriminates whether or not the positioning accuracy of the location information obtained in step 9k is equivalent to or greater than a predetermined value (for example, level 1 as the best accuracy). If the control unit 190 discriminates that the positioning accuracy is equivalent to or greater than the predetermined value (for example, level 1), the control unit 190 shifts to step 9r. If the control unit 190 discriminates that the positioning accuracy is smaller than the predetermined value (for example, level 2 or level 3), the control unit 190 shifts to step 9q.

In step 9q, the control unit 190 composes an e-mail containing in a text thereof a character string "considered to have already arrived at "xxx" but positioned again after "ΔΔ" minutes due to bad accuracy", the information (location information and positioning accuracy) obtained in step 9k, and the positioning time detected in step 9l.

The location name (for example, "school", "park", "crammer") detected in step 9m is set as the character string "xxx". The time corresponding to "ΔΔ" represents a time based on the certain time of step 9o. The control unit 190 sets the mail address registered in the location notification address table (FIG. 3) of the memory unit 160 as a destination of the composed mail. The control unit 190 controls the communications unit 110 to send the e-mail to the destination. After that, the control unit 190 shifts to step 9o.

On the other hand, in step 9r, the control unit 190 composes an e-mail containing in a text thereof a character string "already arrived at "xxx"", the information (location information and positioning accuracy) obtained in step 9k, and the positioning time detected in step 9l. The location name (for example, "school", "park", "crammer") detected in step 9m is set as the character string "xxx". The control unit 190 sets the mail address registered in the location notification address table (FIG. 3) of the memory unit 160 as a destination of the composed mail. The control unit 190 controls the communications unit 110 to send the e-mail to the destination sand ends the processing.

In the cellular telephone having the above-described configuration, when the departure notification time registered in the notification location table has come, the positioning is executed and it is discriminated whether or not the holder exists in the vicinity of the location name corresponding to the departure notification time. The mail is sent to the mail address registered in the location notification address table to notify whether or not the holder has departed from the location.

In addition, when the arrival notification time registered in the notification location table has come, the positioning is executed and it is discriminated whether or not the holder exists in the vicinity of the location name corresponding to the arrival notification time. The mail is sent to the mail address registered in the location notification address table to notify whether or not the holder has arrived at the location.

For this reason, when the holder's actions such as going to school, coming from school, going home, going to a crammer, etc. are known preliminarily, the actions can be confirmed by the e-mails. Since the e-mails are sent in response to the holder's movements, the recipient of the e-mails can clearly recognize the timing of the holder's movements.

In addition, since the notification of confirmation of the departure/arrival is repeated until they are confirmed, the repeated request that may be required when the location notification mail function is employed is unnecessary.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

For example, the cellular telephone executing the positioning stores the notification location table shown in FIG. 5 while the cellular telephone discriminates the location name. However, the cellular telephone receiving the location information may store the notification location table, discriminates the location name on the basis of the location information of which the cellular telephone is notified by the e-mail, notify the holder of the location name, and discriminate the departure/arrival shown in FIG. 9.

In addition, the information to be registered in the notification location table is registered preliminarily. However, the cellular telephone receiving the location information may send the information by an e-mail, and the cellular telephone receiving the e-mail may register the information in the notification location table. In this case, if a specific keyword (for example, "registered in notification location table") is set in the subject of the e-mail, the control unit 190 may read the "location name", "location information", "departure notification time", and "arrival notification time" contained in the text of the e-mail and register them in the notification location table.

The present invention can also be variously modified within a scope which does not depart from the gist of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile radio terminal apparatus comprising:
a location detection unit configured to receive a signal from a GPS satellite periodically and to obtain location information in accordance with the signal;
a memory configured to store the location information obtained by the location detection unit in association with a time when the location information is obtained;
an operation unit configured to accept a request from a user;
a control unit configured, if the operation unit accepts the request from the user, to control the location detection unit to obtain the location information;
an e-mail composing unit configured to compose an e-mail including the location information and a time when the location information has been obtained if the location detection unit obtains the location information under control of the control unit, and to compose an e-mail including the location information stored in the memory and the time associated with the location information if the location detection unit fails to obtain the location information under control of the control unit; and
a transmitter configured to transmit the e-mail composed by the e-mail composing unit.

2. The apparatus according to claim 1, further comprising:
an accuracy detection unit configured to detect accuracy of the location information obtained by the location detection unit,
wherein the control unit composes an e-mail including accuracy information representing the accuracy of the location information detected by the accuracy detection unit.

3. A mobile radio terminal apparatus comprising:
a location detection unit configured to receive a signal from a GPS satellite and to obtain location information in accordance with the signal;
a reception unit configured to receive an e-mail via a radio network;
a control unit configured, if a preset character string is contained in the e-mail received by the reception unit, to repeat a preset number of times a process of controlling the location detection unit to obtain the location information at preset time intervals;
an e-mail composing unit configured to compose an e-mail including the location information and a time when the location information has been obtained if the location detection unit obtains the location information under control of the control unit, and to compose an e-mail indicating failure of positioning if the location detection unit fails to obtain the location information under control of the control unit; and
a transmitter configured to transmit the e-mail composed by the e-mail composing unit.

4. The apparatus according to claim 3, further comprising:
an accuracy detection unit configured to detect accuracy of the location information obtained by the location detection unit,
wherein the control unit composes an e-mail including accuracy information representing the accuracy of the location information detected by the accuracy detection unit.

5. A mobile radio terminal apparatus comprising:
a location detection unit configured to receive a signal from a GPS satellite and to obtain location information in accordance with the signal;
an accuracy detection unit configured to detect accuracy of the location information obtained by the location detection unit;
a memory configured to store a determined location information;
a detection unit configured to compare information representing the location detected by the location detection unit with the location information stored by the memory, and to detect that the apparatus has moved away from a set location based on the determined location information;
a control unit configured, if the detection unit detects that the apparatus has moved away from the set location and if the accuracy detected by the accuracy detection unit is equal to or higher than a predetermined value, to compose an e-mail for a determined destination; and
a transmitter configured, after the control unit composes the e-mail, to transmit the e-mail.

6. The apparatus according to claim 5,
wherein the control unit composes an e-mail including accuracy information representing the accuracy of the location information detected by the accuracy detection unit.

7. A mobile radio terminal apparatus comprising:
a location detection unit configured to receive a signal from a GPS satellite and to obtain location information in accordance with the signal;
an accuracy detection unit configured to detect accuracy of the location information obtained by the location detection unit;
a memory configured to store a determined location information;
a detection unit configured to compare information representing the location detected by the location detection unit with the location information stored by the memory, and to detect that the apparatus has moved close to a set location based on the determined location information;

a control unit configured, if the detection unit detects that the apparatus has moved close to the preset location and if the level of accuracy detected by the accuracy detection unit is equal to or higher than a predetermined value, to compose an e-mail for a preset destination; and a transmitter configured, after the control unit composes the e-mail, to transmit the e-mail.

8. The apparatus according to claim 7, wherein the control unit composes an e-mail including accuracy information representing the accuracy of the location information detected by the accuracy detection unit.

* * * * *